United States Patent
Kawamoto et al.

(10) Patent No.: US 12,130,300 B2
(45) Date of Patent: Oct. 29, 2024

(54) SAMPLE MEASURING APPARATUS, REAGENT CONTAINER, AND METHOD OF MEASURING SAMPLE

(71) Applicant: SYSMEX CORPORATION, Kobe (JP)

(72) Inventors: Yutaka Kawamoto, Kobe (JP); Tomohiro Kuroiwa, Kobe (JP); Shingo Kaida, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 865 days.

(21) Appl. No.: 16/937,769

(22) Filed: Jul. 24, 2020

(65) Prior Publication Data

US 2020/0355713 A1    Nov. 12, 2020

Related U.S. Application Data

(63) Continuation of application No. PCT/JP2018/045089, filed on Dec. 7, 2018.

(30) Foreign Application Priority Data

Jan. 25, 2018 (JP) .................. 2018-010309

(51) Int. Cl.
*G01N 35/02* (2006.01)
*G01N 35/00* (2006.01)
(Continued)

(52) U.S. Cl.
CPC ........... *G01N 35/025* (2013.01); *G01N 35/04* (2013.01); *G01N 35/1002* (2013.01); *G01N 2035/00356* (2013.01); *G01N 2035/0443* (2013.01)

(58) Field of Classification Search
CPC .. G01N 35/025; G01N 35/04; G01N 35/1002; G01N 2035/00356;
(Continued)

(56) References Cited

U.S. PATENT DOCUMENTS 5,324,481 A   6/1994  Dunn et al.
5,741,708 A   4/1998  Carey et al.
(Continued)

FOREIGN PATENT DOCUMENTS

CN   101334416 A   12/2008
CN   104395760 A    3/2015
(Continued)

OTHER PUBLICATIONS

Japanese Office Action mailed on Jun. 20, 2023 in a related Japanese patent application.
(Continued)

*Primary Examiner* — Jill A Warden
*Assistant Examiner* — John McGuirk
(74) *Attorney, Agent, or Firm* — METROLEX IP LAW GROUP, PLLC; Robert L. Scott, Esq.

(57) ABSTRACT

A sample measuring apparatus, a reagent container, and a method of measuring a sample are provided. The sample measuring apparatus includes a reagent container holder and a measuring unit. The reagent container holder holds, by suspending, a reagent container that stores a reagent. The measuring unit that measures a sample by using the reagent.

17 Claims, 13 Drawing Sheets

(51) Int. Cl.
*G01N 35/04* (2006.01)
*G01N 35/10* (2006.01)

(58) Field of Classification Search
CPC ....... G01N 2035/0443; G01N 35/0098; G01N 2035/00445; B01L 2200/16; B01L 2300/0803; B01L 3/52; B01L 9/06
See application file for complete search history.

(56) References Cited

U.S. PATENT DOCUMENTS

| | | |
|---|---|---|
| 5,856,194 A | 1/1999 | Arnquist et al. |
| 2003/0099573 A1 | 5/2003 | Tseung et al. |
| 2012/0237398 A1 | 9/2012 | Katsumi et al. |
| 2019/0024970 A1 * | 1/2019 | Sapia ................ A47G 23/0641 |

FOREIGN PATENT DOCUMENTS

| | | | | |
|---|---|---|---|---|
| JP | H0250681 U | | 4/1990 | |
| JP | H03109639 U | | 11/1991 | |
| JP | H4-328467 A | | 11/1992 | |
| JP | H11-194133 A | | 7/1999 | |
| JP | 2007309740 A | * | 11/2007 | |
| JP | 2009008611 A | | 1/2009 | |
| JP | 2009-085730 A | | 4/2009 | |
| JP | 2011191117 A | * | 9/2011 | ......... G01N 35/1002 |
| JP | 2012137329 A | | 7/2012 | |
| JP | 2012254498 A | * | 12/2012 | |
| JP | 2014119328 A | * | 6/2014 | |
| JP | 2016-114610 A | | 6/2016 | |
| JP | 2017201318 A | | 11/2017 | |
| WO | WO-2016159319 A1 | * | 10/2016 | ........... G01N 33/543 |

OTHER PUBLICATIONS

Communication pursuant to Article 94(3) EPC issued on May 16, 2023 in a counterpart European patent application.
International Search Report (ISR) of PCT/JP2018/045089 mailed on Mar. 5, 2019.
Written Opinion (WO) of PCT/JP2018/045089 mailed on Mar. 5, 2019.
Office Action (JPOA) issued on May 25, 2021 in a counterpart Japanese patent application.
Extended European search report ("EESR") issued on Oct. 20, 2021 in a counterpart European patent application.
Communication pursuant to Rules 70(2) and 70a(2) issued on Nov. 9, 2021 in a counterpart European patent application.
Japanese Office Action mailed on Jul. 5, 2022 in a counterpart Japanese patent application.
Chinese Office Action mailed on Dec. 16, 2022 in a counterpart Japanese patent application.
Chinese Office Action mailed on Aug. 31, 2023 in a related Chinese patent application.
Chinese Office Action mailed on Nov. 30, 2023 in a counterpart Chinese patent application.

* cited by examiner

SAMPLE MEASURING APPARATUS, REAGENT CONTAINER, AND METHOD OF MEASURING SAMPLE

CROSS REFERENCE TO RELATED APPLICATIONS

This application is a continuation application of International Application No. PCT/JP2018/045089, filed on Dec. 7, 2018, which claims priority based on the Article 8 of Patent Cooperation Treaty from prior Japanese Patent Application No. 2018-010309, filed on Jan. 25, 2018, the entire contents of which are incorporated herein by reference.

BACKGROUND

The present disclosure relates to a sample measuring apparatus, a reagent container, and a method of measuring a sample.

Conventionally, there has been known a sample measuring apparatus (for example, see Japanese Patent Application Publication No. 2014-119328 ("Patent Literature 1")).

As illustrated in FIG. 18, the above-mentioned Patent Literature 1 discloses an automatic analyzer 900 (sample measuring apparatus) that includes an analyzing unit 901, which analyzes a sample using a reagent, and a reagent depository 903, which stores multiple reagent bottles 902 each storing the reagent. This automatic analyzer 900 of Patent Literature 1 stores the multiple reagent bottles 902 in a reagent holding rack 905 in the reagent depository 903 with the multiple reagent bottles 902 inserted in box-shaped small sections 904, respectively.

However, since the multiple reagent bottles 902 are stored in the reagent holding rack 905 in the reagent depository 903 with the multiple reagent bottles 902 inserted in the box-shaped small sections 904, respectively, in the automatic analyzer 900 (sample measuring apparatus) described in the above-mentioned Patent Literature 1, the reagent bottles 902 are not likely to be exposed to air in the reagent depository 903. For this reason, the cooling efficiency or the heating efficiency of the reagent is reduced, and it is difficult to keep the reagent cool or warm efficiently. Additionally, there is a disadvantage that the number of parts is increased as more numbers of the box-shaped small sections 904 are provided. Thus, there is the problem that it is difficult to keep the reagent cool or warm efficiently, and also the number of parts is increased.

One or more aspects aim to keep a reagent cool or warm efficiently and also to inhibit an increase in the number of parts.

SUMMARY

A sample measuring apparatus includes: a reagent container holder that holds, by suspending, a reagent container that stores a reagent; and a measuring unit that measures a sample by using the reagent.

A method of measuring a sample includes: arranging a reagent container storing a reagent to be suspended by a reagent container holder; and measuring a sample by using the reagent.

A reagent container includes: a container body that stores a reagent used to measure a sample; and a contact portion that is brought into contact with a reagent container holder and comprises an outer circumference greater than an outer circumference of the container body, the reagent container is configured to be suspended and held in the reagent container holder with the contact portion put in contact with the reagent container holder.

DETAILED DESCRIPTION

Figure 1:
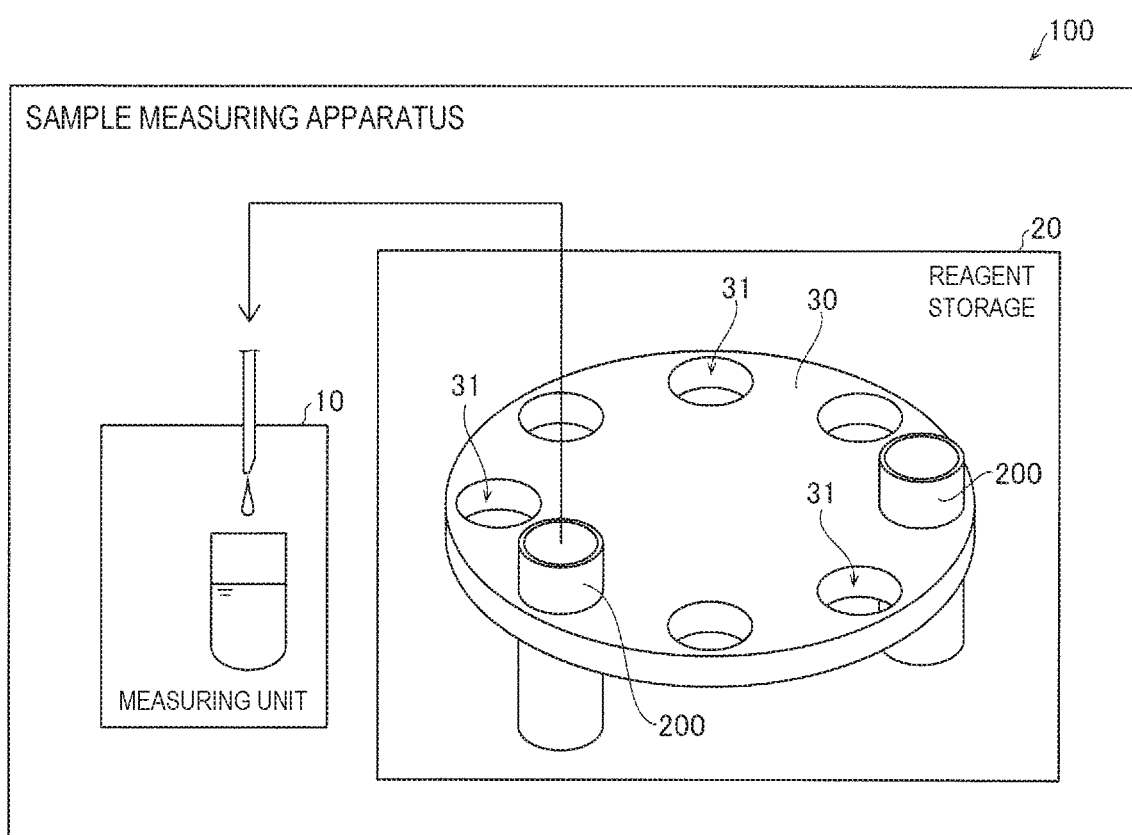
FIG. 1 is a schematic view illustrating an overview of a sample measuring apparatus.

A sample measuring apparatus (100) according to a first aspect includes: a reagent container holder (30) that holds, by suspending, a reagent container (200) that stores a reagent; and a measuring unit (10) that measures a sample by using the reagent.

In the sample measuring apparatus (100) according to a first aspect, with the above-described configuration, it is possible to arrange the reagent container (200) to protrude from the reagent container holder (30) with the reagent container (200) not being covered with the reagent container holder (30). Consequently, the reagent container (200) can be arranged to be exposed to a space, and thus it is possible to improve the cooling efficiency or the heating efficiency of the reagent. Accordingly, it is possible to keep the reagent cool or warm efficiently. Additionally, it is possible to reduce the number of parts than that in a case of providing a box-shaped small section for the reagent container (200). Thus, it is possible to keep the reagent cool or warm efficiently and also to inhibit an increase in the number of parts. Furthermore, since the reagent container holder (30) can hold, by suspending, the reagent container (200), it is possible to hold the reagent container (200) stably. Consequently, when the reagent is aspirated from the reagent container (200), it is possible to insert an aspiration tube into the reagent container (200) correctly.

In the sample measuring apparatus (100) according to a first aspect, it may be preferable that the reagent container holder (30) includes a plate-shaped member (30a) that has a through-hole (33), and the plate-shaped member (30a) holds the reagent container (200) such that a bottom surface (251) of the reagent container (200) is exposed from the through-hole (33). With this configuration, it is possible to insert the reagent container (200) from the through-hole (33) of the plate-shaped member (30a) and provide the reagent container (200) in the reagent container holder (30) easily.

In this case, it may be preferable that the plate-shaped member (30a) includes suspending portions (32) that each suspend the reagent container (200) to hold. With this configuration, it is possible to hold the multiple reagent containers (200) by the multiple suspending portions (32), and thus it is possible to easily increase the amount and the types of the reagent to be held.

In the configuration in which the above-described plate-shaped member (30a) includes the suspending portions (32), it may be preferable that each suspending portion (32) is tapered downward. With this configuration, the reagent container (200) can be guided to a providing position of the suspending portion (32) easily with the shape tapered downward, and thus it is possible to provide the reagent container (200) in the reagent container holder (30) easily.

In the configuration in which the above-described plate-shaped member (30a) includes the suspending portions (32), it may be preferable that the suspending portions (32) each includes a lower stage opening (33a) and an upper stage opening (33b) that is provided above the lower stage opening (33a) and that is with an outer circumference greater than an outer circumference of the lower stage opening (33a). With this configuration, it is possible to insert the reagent container (200) from the upper stage opening (33b) having the great outer circumference into the suspending portion (32) easily. Additionally, since the reagent container (200) inserted from the upper stage opening (33b) can be guided easily to the lower stage opening (33a) continuing the upper stage opening (33b), it is possible to insert the reagent container (200) in the lower stage opening (33a) easily.

In the sample measuring apparatus (100) according to a first aspect, it may be preferable that the reagent container holder (30) includes a circular outer circumferential edge such that the reagent containers (200) are arranged circularly. With this configuration, it is possible to arrange the multiple reagent containers (200) circularly in the circular reagent container holder (30) and store the multiple reagent containers (200) in a depository compactly.

In the sample measuring apparatus (100) according to a first aspect, it may be preferable that the reagent container holder (30) includes holding portions (31) that position the reagent containers (200). With this configuration, it is possible to arrange the reagent containers (200) in predetermined positions of the reagent container holder (30) accurately and also to inhibit the reagent containers (200) from moving with respect to the reagent container holder (30).

In the sample measuring apparatus (100) according to a first aspect, it may be preferable that the reagent container holder (30) includes a first reagent container holder (34) and includes a first supporting unit (361) that supports the first reagent container holder (34) and a first driving unit (36) that rotates the first supporting unit (361). With this configuration, it is possible to rotate and move the first reagent container holder (34) easily by the first driving unit (36).

In this case, it may be preferable that the reagent container holder (30) includes a second reagent container holder (35) arranged around the first reagent container holder (34) and includes a rotation table (38) that supports the second reagent container holder (35) through a joint part (39), a second supporting unit (371) that supports the rotation table (38), and a second driving unit (37) that rotates the second supporting unit (371). With this configuration, it is possible to rotate and move the second reagent container holder (35) independently from the first reagent container holder (34).

It may be preferable that the sample measuring apparatus (100) according to a first aspect includes: a reagent storage (20) that includes a cover (21a) that covers top portions of the reagent containers (200), and the reagent storage (20) allows the reagent container holder (30) to be arranged in the reagent storage (20) so as to store the reagent containers (200). With this configuration, it is possible to keep the multiple reagent containers (200) stored in the reagent storage (20) including the cover (21a) covering the top portions cool or warm efficiently.

In this case, it may be preferable that the cover (21a) covers a top portion of the reagent storage (20) and has an outer circumference greater than an outer circumference of the reagent storage (20). With this configuration, the top portion of the reagent storage (20) can be covered with the cover (21a) reliably, and thus it is possible to keep the multiple reagent container (200) stored in the reagent storage (20) cool or warm efficiently.

In the sample measuring apparatus (100) according to a first aspect, it may be preferable that the reagent contains any of capture substances that are bound to target substances in the sample by an antigen-antibody reaction, solid-phase carriers that are bound to the capture substances, and labeling substances that are bound to the target substances by the antigen-antibody reaction. With this configuration, it is possible to keep the capture substances, the solid-phase carriers, or the labeling substances used in the immune testing cool or warm efficiently.

A reagent container (200) according to a second aspect is used in the sample measuring apparatus (100) according to a first aspect described above.

A method of measuring a sample according to a third aspect includes: arranging a reagent container (200) storing a reagent to be suspended by a reagent container holder (30); and measuring a sample by using the reagent.

In the method of measuring a sample according to a third aspect, with the above-described configuration, it is possible to arrange the reagent container (200) to protrude from the reagent container holder (30) with the reagent container (200) not being covered with the reagent container holder (30). Consequently, the reagent container (200) can be arranged to be exposed to a space, and thus it is possible to improve the cooling efficiency or the heating efficiency of the reagent. Accordingly, it is possible to keep the reagent cool or warm efficiently. Additionally, it is possible to reduce the number of parts than that in a case of providing a box-shaped small section for the reagent container (200). Thus, it is possible to provide a method of measuring a sample capable of keeping the reagent cool or warm efficiently and also inhibiting an increase in the number of parts. Furthermore, since the reagent container holder (30) can hold, by suspending, the reagent container (200), it is possible to hold the reagent container (200) stably. Consequently, when the reagent is aspirated from the reagent container (200), it is possible to insert an aspiration tube into the reagent container (200) correctly.

In the method of measuring a sample according to a third aspect, it may be preferable that the reagent container holder (30) includes a plate-shaped member (30a) that has a through-hole (33), and the reagent container is provided in the plate-shaped member (30a) such that a bottom surface (251) of the reagent container (200) is exposed from the through-hole (33). With this configuration, it is possible to insert the reagent container (200) from the through-hole (33) of the plate-shaped member (30a) and provide the reagent container (200) in the reagent container holder (30) easily.

In the method of measuring a sample according to a third aspect, it may be preferable that the reagent containers (200) are provided circularly in the reagent container holder (30) that includes a circular outer circumferential edge. With this configuration, it is possible to arrange the multiple reagent containers (200) circularly in the circular reagent container holder (30) and store the multiple reagent containers (200) in a depository compactly.

In the method of measuring a sample according to a third aspect, it may be preferable that the reagent containers (200) are positioned and provided by holding portions (31) of the reagent container holder (30). With this configuration, it is possible to arrange the reagent containers (200) in predetermined positions of the reagent container holder (30) accurately and also to inhibit the reagent containers (200) from moving with respect to the reagent container holder (30).

In the method of measuring a sample according to a third aspect, it may be preferable that the reagent contains any of capture substances that are bound to target substances in the sample by an antigen-antibody reaction, solid-phase carriers that are bound to the capture substances, and labeling substances that are bound to the target substances by the antigen-antibody reaction. With this configuration, it is possible to keep the capture substances, the solid-phase carriers, or the labeling substances used in the immune testing cool or warm efficiently.

In the method of measuring a sample according to a third aspect, it may be preferable that the reagent containers (200) are provided in the reagent container holder (30) such that 50% or more of a surface of each reagent container (200) is exposed to a space inside the reagent storage (20). With this configuration, since 50% or more of the surface of the reagent container (200) can be exposed to the space inside the reagent storage (20), it is possible to further improve the cooling efficiency or the heating efficiency of the reagent.

A reagent container (200) according to a fourth aspect includes: a container body (231, 232, 233) that stores a reagent used to measure a sample; and a contact portion (242) that is brought into contact with a reagent container holder (30) and is also with an outer circumference greater than an outer circumference of the container body (231, 232, 233), and the reagent container (200) is suspended and held in the reagent container holder (30) with the contact portion (242) put in contact with the reagent container holder (30).

In the reagent container (200) according to a fourth aspect, with the above-described configuration, it is possible to arrange the reagent container (200) to protrude from the reagent container holder (30) with the reagent container (200) not being covered with the reagent container holder (30). Consequently, the reagent container (200) can be arranged to be exposed to a space, and thus it is possible to improve the cooling efficiency or the heating efficiency of the reagent. Accordingly, it is possible to keep the reagent cool or warm efficiently. Additionally, it is possible to reduce the number of parts than that in a case of providing a box-shaped small section for the reagent container (200).

Thus, it is possible to provide a reagent container (200) capable of keeping the reagent cool or warm efficiently and also inhibiting an increase in the number of parts. Furthermore, since the reagent container holder (30) can hold, by suspending, the reagent container (200), it is possible to hold the reagent container (200) stably. Consequently, when the reagent is aspirated from the reagent container (200), it is possible to insert an aspiration tube into the reagent container (200) correctly.

In the reagent container (200) according to a fourth aspect, it may be preferable that the reagent container holder (30) includes a plate-shaped member (30a) that has a through-hole (33), and the reagent container (200) is held such that a bottom surface (251) is exposed from the through-hole (33) of the plate-shaped member (30a). With this configuration, it is possible to insert the reagent container (200) from the through-hole (33) of the plate-shaped member (30a) and provide the reagent container (200) in the reagent container holder (30) easily.

It may be preferable that the reagent container (200) according to a fourth aspect includes: a bottom surface (251) that can pass through the through-hole (33) of the reagent container holder (30); and a middle side surface portion (252) that is with an outer circumference greater than an outer circumference of the through-hole (33), between the bottom surface and a top surface. With this configuration, it is possible to insert the reagent container (200) from the through-hole (33) of the reagent container holder (30) and provide the reagent container (200) in the reagent container holder (30) easily.

It may be preferable that the reagent container (200) according to a fourth aspect is arranged circularly in the reagent container holder (30) that includes a circular outer circumferential edge. With this configuration, it is possible to arrange the multiple reagent containers (200) circularly in the circular reagent container holder (30) to store the multiple reagent containers (200) compactly.

It may be preferable that the reagent container (200) according to a fourth aspect is positioned and arranged in the reagent container holder (30). With this configuration, it is possible to arrange the reagent container (200) in a predetermined position of the reagent container holder (30) accurately and also to inhibit the reagent container (200) from moving with respect to the reagent container holder (30).

In the reagent container (200) according to a fourth aspect, it may be preferable that the reagent contains any of capture substances that are bound to target substances in the sample by an antigen-antibody reaction, solid-phase carriers that are bound to the capture substances, and labeling substances that are bound to the target substances by the antigen-antibody reaction. With this configuration, it is possible to keep the capture substances, the solid-phase carriers, or the labeling substances used in the immune testing cool or warm efficiently.

According to one or more aspects, it is possible to keep a reagent cool or warm efficiently and also to inhibit an increase in the number of parts.

Hereinafter, embodiments are described with reference to the drawings.

[Overview of Sample Measuring Apparatus]

First, an overview of a sample measuring apparatus 100 according to an embodiment is described with reference to FIG. 1.

The sample measuring apparatus 100 is an apparatus that measures a measurement specimen created by adding a predetermined reagent to a sample collected from a subject.

The subject is mostly a human; however, the subject may be another animal other than a human. The sample measuring apparatus 100 performs measurement of a sample collected from a patient for laboratory testing or medical studies, for example. The sample is a sample derived from a living body. The sample derived from a living body is a liquid such as blood (whole blood, serum, or plasma), urine, or other body fluid collected from the subject, a liquid obtained by performing predetermined preprocessing on the collected body fluid or blood, or the like, for example. Additionally, the sample may be other than the liquid, such as a part of tissues or cells of the subject, for example. The sample measuring apparatus 100 detects predetermined target components contained in the sample. The target components may include predetermined components, cells, and particles in the sample of blood or urine, for example. The target components may be nucleic acids such as DNA (deoxyribonucleic acids), cells and cell substances, antigens or antibodies, proteins, peptides, and the like. The sample measuring apparatus 100 may be a measuring apparatus such as a blood cell counter, a blood coagulation measuring apparatus, an immune measuring apparatus, or a urine particle measuring apparatus, or a measuring apparatus other than the above.

For instance, the sample measuring apparatus 100 is an immune measuring apparatus that detects subject substances in the sample by using antigen-antibody reaction. The immune measuring apparatus detects antigens or antibodies, proteins, peptides, and the like contained in blood as the target components, for example. The immune measuring apparatus obtains serum or plasma as the sample and performs quantitative measurement or qualitative measurement on the antigens or the antibodies and the like contained in the sample. The antigen-antibody reaction includes not only a reaction between the antigens and the antibodies but also a reaction using specific binding substances such as aptamers. The aptamers are nucleic acid molecules or peptides synthesized to be bound specifically to specific substances.

The sample measuring apparatus 100 adds predetermined one or more types of reagents to the sample and prepares a measurement specimen. The reagents are set in the sample measuring apparatus 100 with the reagents each stored in a bottle-shaped reagent container 200. As illustrated in FIG. 1, the sample measuring apparatus 100 includes a measuring unit 10, a reagent storage 20, and a reagent container holder 30. The reagent stored in the reagent container 200 of the reagent storage 20 is used for immune testing. For example, the reagent contains any of capture substances that are bound to target substances in the sample by the antigen-antibody reaction, solid-phase carriers that are bound to the capture substances, and labeling substances that are bound to the target substances by the antigen-antibody reaction.

The measuring unit 10 measures the sample by using the reagent. Specifically, the measuring unit 10 adds the reagent from the reagent container 200 into the sample to prepare a measurement specimen and measures the sample. Additionally, the measuring unit 10 is configured to detect components contained in the measurement specimen prepared from the sample and the reagent. For a method of detecting the target components by the measuring unit 10, any method such as a chemical method, an optical method, or an electromagnetic method can be adopted depending on the target components. Based on the detection result, the measuring unit 10 measures whether there are the target components, the number or the amount of the target components, a density or a presence rate of the target components, and so on, for example.

The reagent storage 20 stores the reagent container 200 storing the reagent. The reagent storage 20 keeps the reagent cool or warm at a predetermined temperature. For example, the reagent storage 20 keeps the reagent cool at a predetermined temperature. That is, the temperature inside the reagent storage 20 is kept lower than the temperature outside the reagent storage 20.

The reagent container holder 30 is arranged in the reagent storage 20. Additionally, the reagent container holder 30 can hold multiple reagent containers 200. The reagent container holder 30 holds, by suspending or hanging, the reagent containers 200 storing the reagents. Specifically, the reagent container holder 30 includes multiple holding portions 31 that hold the reagent containers 200. Moreover, the reagent containers 200 are set in the reagent container holder 30 automatically by the sample measuring apparatus 100 or manually by a user. Furthermore, the reagent container holder 30 may hold the reagent containers 200 with an engagement portion (not-illustrated) provided in a predetermined part of each reagent container 200 being engaged with a supporting portion of the reagent container holder 30. Additionally, the reagent container holder 30 is formed in a flat shape extending horizontally.

With this, it is possible to arrange the reagent containers 200 to protrude from the reagent container holder 30 to the inside of the reagent storage 20 with the reagent containers 200 not being covered with the reagent container holder 30. Consequently, the reagent containers 200 can be arranged to be exposed to a space inside the reagent storage 20, and thus it is possible to improve the cooling efficiency or the heating efficiency of the reagents. Accordingly, it is possible to keep the reagents cool or warm efficiently. Additionally, it is possible to reduce the number of parts than that in a case of providing box-shaped small sections for the reagent containers 200, respectively. Moreover, since the space for arranging the small sections can be omitted, it is possible to simplify and miniaturize the apparatus configuration. Thus, it is possible to keep the reagents cool or warm efficiently and also to inhibit an increase in the number of parts. Furthermore, since the reagent container holder 30 can hold, by suspending, the reagent containers 200, it is possible to hold the reagent containers 200 stably. Consequently, when the reagent is aspirated from each reagent container 200, it is possible to insert an aspiration tube into the reagent container 200 correctly.

The reagent container holder 30 has a circular shape in a plan view, for example. Additionally, the reagent container holder 30 allows the multiple reagent containers 200 to be arranged circularly. That is, the multiple holding portions 31 of the reagent container holder 30 are arranged circularly. The reagent container holder 30 may have a shape other than a circular shape. For example, the reagent container holder 30 may be formed in a rectangular shape in a plan view. Moreover, the multiple reagent containers 200 may be arranged linearly.

Furthermore, in the reagent container holder 30, the multiple holding portions 31 arranged in the form of a single circle may be provided, or the multiple holding portions 31 arranged in the form of double circles may be provided. Additionally, in the reagent container holder 30, the multiple holding portions 31 arranged in the form of triple or more circles may be provided.

Next, a method of measuring a sample executed by the sample measuring apparatus 100 of an embodiment is described simply. The method of measuring a sample includes the following steps (1) and (2).

(1) The reagent containers 200 storing the reagents are suspended and provided in the reagent container holder 30.

(2) The sample is measured by using the reagents in the reagent storage 20.

In the method of measuring a sample of an embodiment, as described above, the reagent containers 200 storing the reagents are suspended and provided in the reagent container holder 30. In this way, it is possible to arrange the reagent containers 200 to protrude from the reagent container holder 30 to the inside of the reagent storage 20 with the reagent containers 200 not being covered with the reagent container holder 30. Consequently, the reagent containers 200 can be arranged to be exposed to the space inside the reagent storage 20, and thus it is possible to improve the cooling efficiency or the heating efficiency of the reagents. Accordingly, it is possible to keep the reagents cool or warm efficiently. Additionally, it is possible to reduce the number of parts than that in the case of providing the box-shaped small sections for the reagent containers 200, respectively. Moreover, since the space for arranging the small sections can be omitted, it is possible to simplify and miniaturize the apparatus configuration. Thus, it is possible to provide a method of measuring a sample capable of keeping the reagents cool or warm efficiently and also inhibiting an increase in the number of parts.

[Specific Configuration Example of Sample Measuring Apparatus]

Next, a specific configuration example of the sample measuring apparatus 100 is described in details with reference to FIGS. 2 to 17. In the examples of FIGS. 2 to 17, the sample measuring apparatus 100 is an immune measuring apparatus that detects subject substances in the sample by using the antigen-antibody reaction.

The sample measuring apparatus 100 includes the measuring unit 10, the reagent storage 20, and the reagent container holder 30. Additionally, in the configuration example of FIG. 2, the sample measuring apparatus 100 includes a housing 110, a sample transport unit 120, a sample dispensing unit 130, a reaction container supply unit 140, a reaction container transfer unit 150, a reaction unit 160, a reagent container transfer unit 170, a BF separation unit 180, and a reagent dispensing unit 190. The measuring unit 10 includes a detection unit 11 and a control unit 12.

The housing 110 has a box shape that can store the units of the sample measuring apparatus 100 therein. The housing 110 may have a configuration in which the units of the sample measuring apparatus 100 are stored on a single layer or may have a layer configuration in which multiple layers are provided in a vertical direction to allocate and arrange the units of the sample measuring apparatus 100 on each layer.

The sample transport unit 120 is configured to transport the sample collected from the subject to an aspiration position of the sample dispensing unit 130. The sample transport unit 120 can transport a rack provided with multiple test tubes each storing the sample to a predetermined sample aspiration position.

The sample dispensing unit 130 aspirates the sample transported by the sample transport unit 120 and dispenses the aspirated sample into a reaction container 40. The sample dispensing unit 130 includes a pipette connected to a fluid circuit for performing aspiration and ejection and a movement mechanism for moving the pipette. The sample dispensing unit 130 attaches a dispensing tip set in a not-illustrated tip supply unit to a tip end of the pipette and aspirates a predetermined amount of the sample from the transported test tube into the dispensing tip. The sample dispensing unit 130 dispenses the aspirated sample into the reaction container 40 arranged at a predetermined sample dispensing position. After the dispensing, the sample dispensing unit 130 removes the dispensing tip from the tip end of the pipette and discards the dispensing tip.

The reaction container supply unit 140 stores multiple reaction containers 40. The reaction container supply unit 140 can supply the reaction container transfer unit 150 with the reaction containers 40 one by one at a predetermined reaction container supply position.

The reaction container transfer unit 150 transfers the reaction container 40. The reaction container transfer unit 150 obtains the reaction container 40 from the reaction container supply position and transfers the reaction container 40 to corresponding positions of processing of the sample dispensing unit 130, the reagent dispensing unit 190, the reaction unit 160, the detection unit 11, and so on. The reaction container transfer unit 150 includes a catcher that grabs the reaction container 40 or a holding portion having a hole in which the reaction container 40 is to be provided, and a movement mechanism that moves the catcher or the holding portion. The movement mechanism is moved in a direction of a single axis or directions of multiple axes by one or more linear motion mechanisms capable of moving linearly. The movement mechanism may include an arm mechanism that rotates horizontally about a rotational axis and an articulated robot mechanism. One or more reaction container transfer units 150 are provided.

The reaction unit 160 includes a heater and a temperature sensor and holds the reaction container 40 to heat the specimen stored in the reaction container 40 and to make a reaction. With the heating, the sample and the reagent stored in the reaction container 40 are reacted. One or more reaction units 160 are provided in the housing 110. Each reaction unit 160 may be provided to be fixed in the housing 110 or may be provided movably in the housing 110. When the reaction unit 160 is configured to be movable, the reaction unit 160 may function as a part of the reaction container transfer unit 150.

The reagent container transfer unit 170 can transfer the reagent container 200. For example, the reagent container transfer unit 170 can lift the reagent container 200 by a not-illustrated hand mechanism and set the reagent container 200 in the corresponding holding portion 31 of the reagent container holder 30.

The BF separation unit 180 has a function of executing BF separation processing for separating a liquid phase and a solid phase from the reaction container 40. The BF separation unit 180 includes one or more processing ports each can be provided with the reaction container 40. In the processing port, a magnetic source 182 (see FIG. 16) that collects magnetic particles contained in an R2-reagent and a cleaning unit 181 (see FIG. 16) that performs aspiration of a liquid phase and supplying of a cleaning liquid are provided. The BF separation unit 180 aspirates a liquid phase in the reaction container 40 and supplies the cleaning liquid by the cleaning unit 181 with the magnetic particles in which the later-described immune complexes are formed being collected. The cleaning unit 181 includes an aspiration channel of the liquid phase and an ejection channel of the cleaning liquid and is connected to the not-illustrated fluid circuit. With this, it is possible to separate unnecessary components contained in the liquid phase from the bound immune complex and magnetic particles and remove the unnecessary components.

The reagent dispensing unit 190 aspirates the reagent in the reagent container 200 and dispenses the aspirated reagent into the reaction container 40. The reagent dispensing unit 190 can move an aspiration tube 190a for performing aspiration and ejection of the reagent in a horizontal direction between a reagent aspiration position and a reagent dispensing position. Additionally, the reagent dispensing unit 190 can move the aspiration tube 190a downward to advance into the reagent container 200. Moreover, the reagent dispensing unit 190 can move the aspiration tube 190a upward to retract the aspiration tube 190a to an upper position of the reagent container 200. The aspiration tube 190a is connected with the not-illustrated fluid circuit, aspirates a predetermined amount of the reagent from the reagent container 200, and dispenses the reagent into the reaction container 40 transferred to the reagent dispensing position.

The aspiration tube 190a is connected to a liquid surface sensor. The liquid surface sensor is connected to the control unit 12. When the aspiration tube 190a aspirates the reagent from the reagent container 200, the liquid surface sensor detects a reagent liquid surface based on a change in capacitance due to a contact between the liquid surface of the reagent and the aspiration tube 190a and outputs the detection result to the control unit 12. Additionally, the control unit 12 monitors the operation amount of the reagent dispensing unit 190 to monitor the movement amount of the aspiration tube 190a in the vertical direction.

Three reagent dispensing units 190 are provided for dispensing of R1-reagent to R3-reagent, respectively, for example. A single reagent dispensing unit 190 may dispense multiple types of reagents. In the configuration example illustrated in FIG. 2, the reagent dispensing unit 190 includes a first reagent dispensing unit 191 that dispenses the R1-reagent, a second reagent dispensing unit 192 that dispenses the R2-reagent, and a third reagent dispensing unit 193 that dispenses the R3-reagent. Additionally, the reagent dispensing unit 190 includes a fourth reagent dispensing unit 194 that dispenses an R4-reagent and a fifth reagent dispensing unit 195 that dispenses an R5-reagent.

The first reagent dispensing unit 191 can move the aspiration tube 190a between a hole portion 21d on the most inner circumference side for aspirating the R1-reagent and a predetermined R1-reagent dispensing position. The second reagent dispensing unit 192 can move the aspiration tube 190a between a hole portion 21d on the most outer circumference side for aspirating the R2-reagent and a predetermined R2-reagent dispensing position. The third reagent dispensing unit 193 can move the aspiration tube 190a between a hole portion 21d in a radial middle position for aspirating the R3-reagent and a predetermined R3-reagent dispensing position. The fourth reagent dispensing unit 194 and the fifth reagent dispensing unit 195 are connected with reagent containers (not illustrated) storing the R4-reagent and the R5-reagent through liquid transfer tubes, respectively, and can eject the reagents into the reaction container 40 transferred by the reaction container transfer unit 150.

The detection unit 11 includes a light detector 11a (see FIG. 16) such as a photomultiplier tube. The detection unit 11 uses the light detector 11a to obtain light generated in a reaction process of a luminescent substrate with labeling antibodies bound to the antigens of the sample on which the various types of processing is performed and measures the amount of the antigens contained in the sample.

The control unit 12 includes a processor 12a such as a CPU and a storage unit 12b such as a ROM, a RAM, and a hard disk. The processor 12a functions as a control unit of the sample measuring apparatus 100 by executing a control program stored in the storage unit 12b. The control unit 12 controls operations of the above-described units of the sample measuring apparatus 100. Additionally, the control unit 12 measures the result detected by the detection unit 11.

Figure 2:
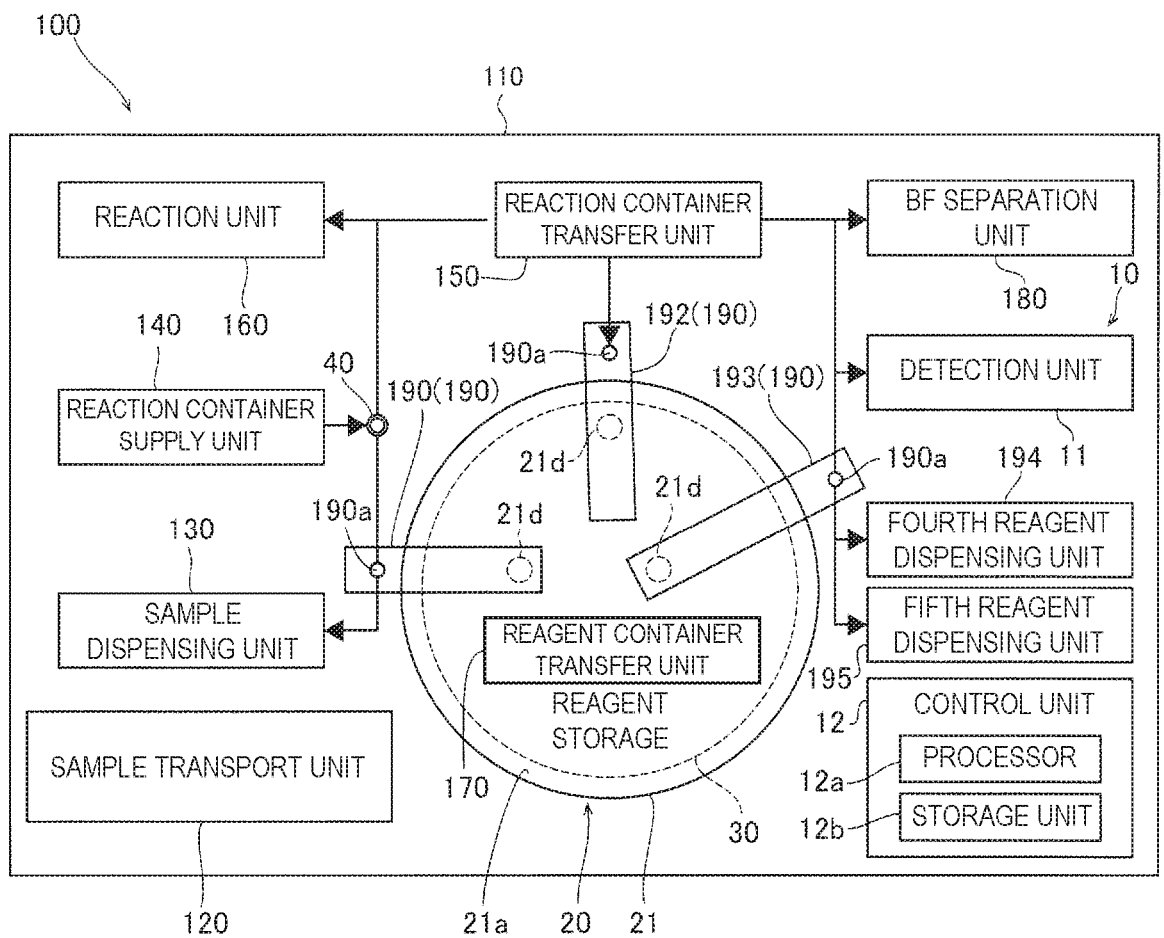
FIG. 2 is a schematic plan view illustrating a configuration example of a sample measuring apparatus.
Figure 3:
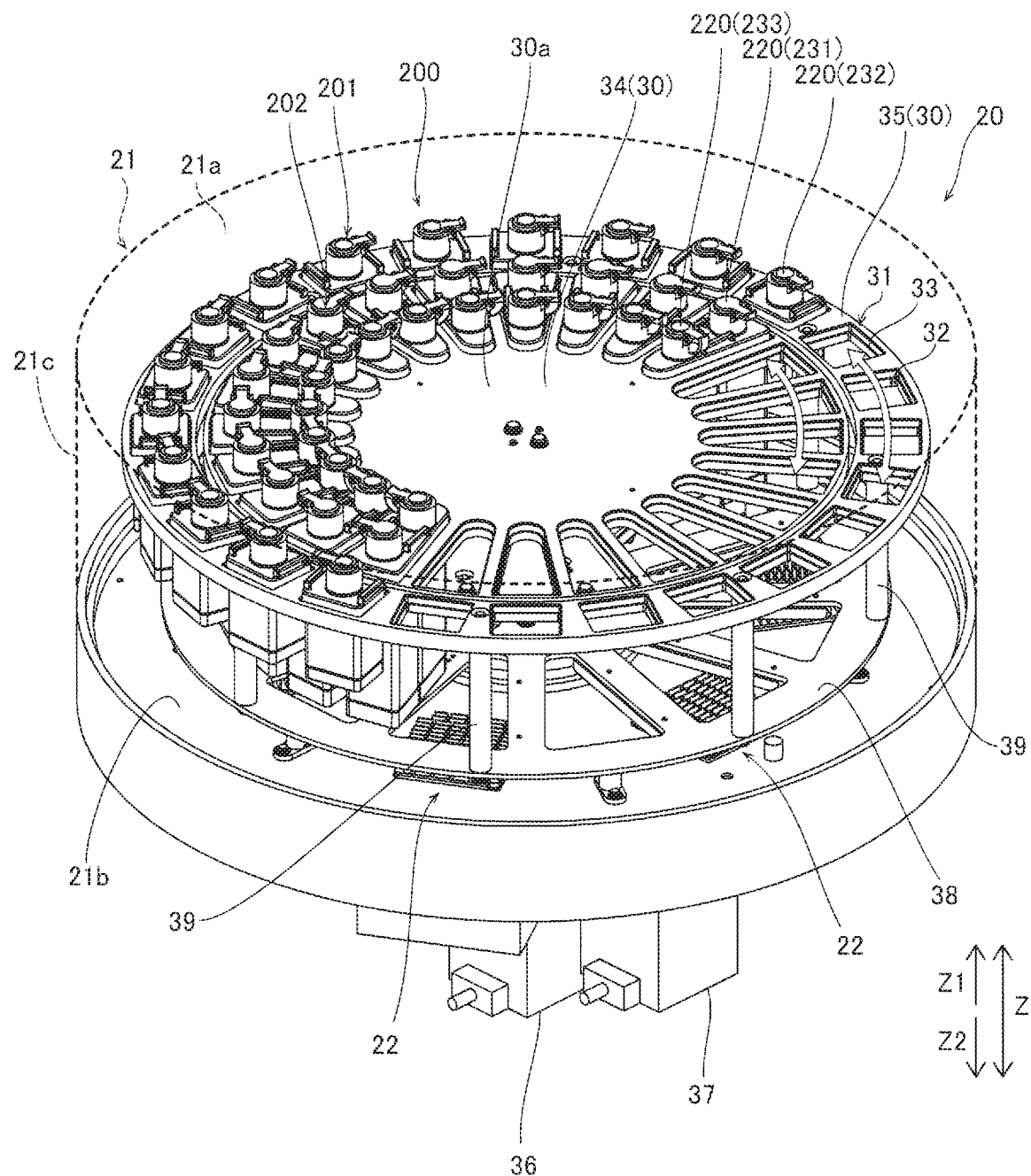
FIG. 3 is a perspective view illustrating a configuration example of a reagent storage.

In the configuration example of FIG. 2, the sample measuring apparatus 100 includes the box-shaped reagent storage 20 storing the reagent container holder 30. As illustrated in FIG. 3, the reagent container holder 30 is provided in a case 21 having a function of insulating heat of the reagent storage 20. The reagent storage 20 includes the reagent container holder 30 and a cooling mechanism 22 in the case 21 and keeps the reagent in the reagent container 200 set in the reagent container holder 30 cool at a constant temperature appropriate for storing. Additionally, the reagent storage 20 allows the reagent container holder 30 to be arranged in the reagent storage 20 so as to store the multiple reagent containers 200.

The case 21 includes an inner space defined by circular-shaped cover 21a and bottom surface portion 21b and a cylindrical-shaped side surface portion 21c. The cover 21a, the bottom surface portion 21b, and the side surface portion 21c include heat insulation materials to insulate heat of the inside and the outside of the case 21. For example, the cover 21a, the bottom surface portion 21b, and the side surface portion 21c include foam materials. This makes it possible to store the reagent containers 200 at a low temperature.

The cover 21a covers top portions of the reagent containers (200). The cover 21a has a circular plate shape. Additionally, the cover 21a has an outer circumference greater than an outer circumference of the reagent storage 20. Thus, the cover 21a can cover a top portion of the reagent storage 20 reliably, and thus it is possible to keep the multiple reagent containers 200 stored in the reagent storage 20 cool or warm more efficiently.

The reagent storage 20 includes the hole portion 21d that allows the reagent dispensing unit 190 to advance into the reagent storage 20. The hole portion 21d is provided in the cover 21a. Additionally, multiple hole portions 21d are provided.

The cooling mechanism 22 includes a cooling unit including the Peltier device or the like and a fin transmitting heat, for example. Additionally, multiple cooling mechanisms 22 are provided near the bottom surface portion 21b of the reagent storage 20. Air inside the reagent storage 20 is sent to the cooling mechanisms 22 by a fan, and the cooled air is circulated in the reagent storage 20.

The reagent container holder 30 can hold the multiple reagent containers 200. The reagent container holder 30 includes the multiple holding portions 31. Specifically, the reagent container holder 30 includes suspending portions 32 that suspend the reagent containers 200 to hold. Additionally, the reagent container holder 30 has through-holes 33. Moreover, the reagent container holder 30 is formed to hold the multiple reagent containers 200 arranged in a circumferential direction. In the configuration example of FIG. 3, the reagent container holder 30 includes a first reagent container holder 34 and a second reagent container holder 35. Furthermore, the reagent container holder 30 includes a first driving unit 36 that rotates the first reagent container holder 34 and a second driving unit 37 that rotates the second reagent container holder 35. Additionally, the reagent container holder 30 includes a rotation table 38 and joint parts 39.

Figure 4:
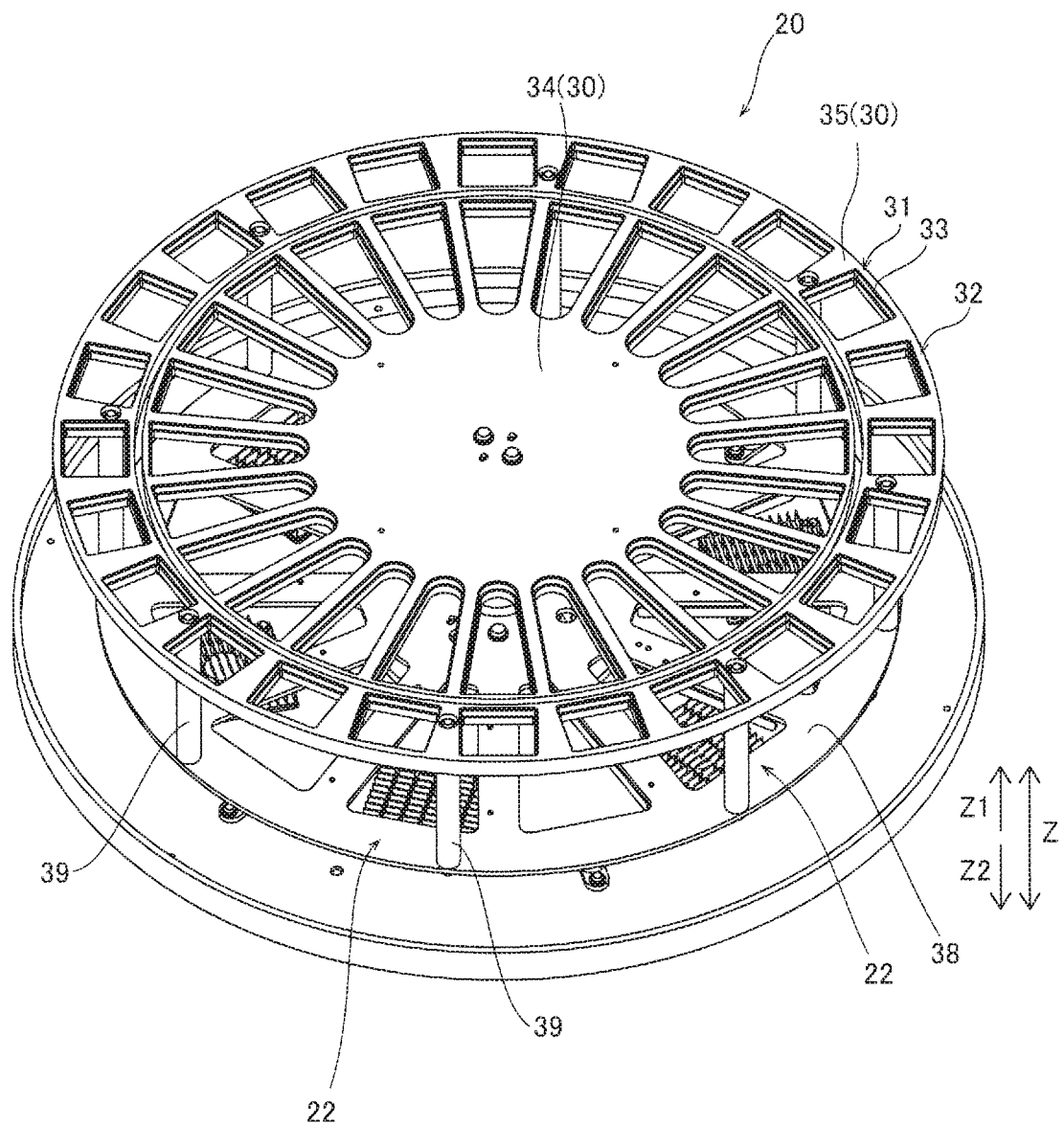
FIG. 4 is a perspective view illustrating a configuration example of a reagent container holder.

In this case, as illustrated in FIGS. 3 and 4, the reagent container holder 30 is formed in a flat shape extending horizontally. With this, it is possible to keep the reagents cool or warm efficiently and also to inhibit an increase in the number of parts.

Specifically, the reagent container holder 30 is configured to hold the reagent containers 200 such that 50% or more of the surface of each reagent container 200 is exposed to the space inside the reagent storage 20. Thus, since 50% or more of the surface of the reagent container 200 can be arranged to be exposed to the space inside the reagent storage 20, it is possible to further improve the cooling efficiency or the heating efficiency of the reagents.

More preferably, the reagent container holder 30 is configured to hold the reagent containers 200 such that 80% or more of the surface of each reagent container 200 is exposed to the space inside the reagent storage 20. Thus, since 80% or more of the surface of the reagent container 200 can be arranged to be exposed to the space inside the reagent storage 20, and thus it is possible to further improve the cooling efficiency or the heating efficiency of the reagents.

For example, the reagent container holder 30 holds the reagent containers 200 by suspending by the suspending portions 32. With this, an upper portion of each reagent container 200 can be supported by the reagent container holder 30, and thus it is possible to reliably expose a lower portion of the reagent container 200 storing the reagent to the inside of the reagent storage 20. Additionally, since the upper portion of the reagent container 200 can be supported, it is possible to hold the reagent container 200 stably when the reagent is aspirated from the above.

Moreover, the reagent container holder 30 is configured to hold the multiple reagent containers 200 such that the exposed portions of the adjacent reagent containers 200 face each other. That is, a space between the adjacent reagent containers 200 other than portions at a height position at which the flat-shaped reagent container holder 30 holds the reagent containers 200 is opened to the inside of the reagent storage 20. Thus, since no member is arranged between the adjacent reagent containers 200, it is possible to make a distance between the multiple reagent containers 200 close. Consequently, the space for arranging the reagent container 200 can be made small, and thus it is possible to miniaturize the apparatus effectively.

Figure 5:
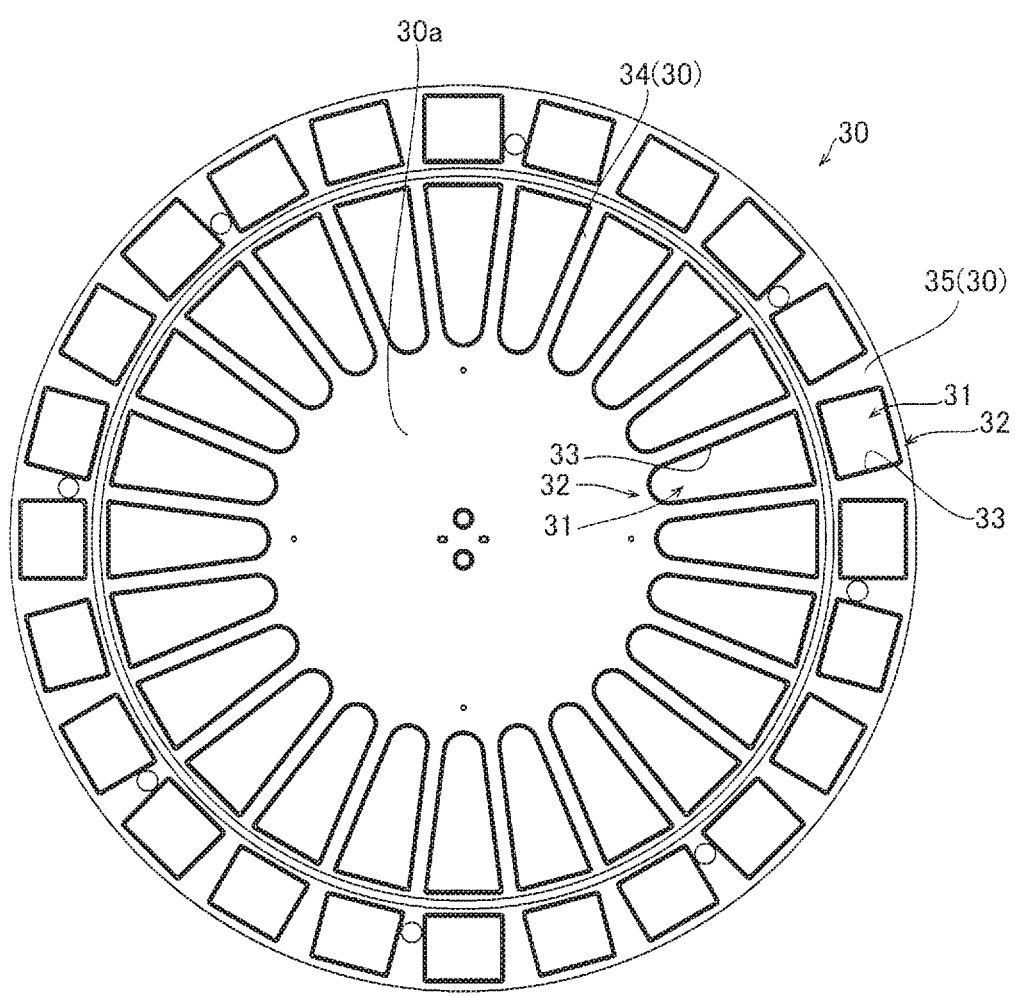
FIG. 5 is a plan view illustrating a configuration example of a reagent container holder.

As illustrated in FIGS. 3 to 5, the reagent container holder 30 is formed such that the multiple reagent containers 200 are arranged circularly and has a substantially circular outer circumferential edge. With this, it is possible to arrange the multiple reagent containers 200 circularly in the substantially circular reagent container holder 30 and store the multiple reagent containers 200 in a depository compactly. Additionally, the first reagent container holder 34 of the reagent container holder 30 is formed in a circular shape. Moreover, the second reagent container holder 35 is formed in a ring shape to surround the first reagent container holder 34 in a plan view. That is, the second reagent container holder 35 is arranged around the first reagent container holder 34. The first reagent container holder 34 and the second reagent container holder 35 are arranged concentrically and can be rotated independently from each other. Furthermore, the first reagent container holder 34 and the second reagent container holder 35 are arranged at substantially the same height positions.

The first reagent container holder 34 on the inner circumference side can hold the multiple reagent containers 200 circularly. The second reagent container holder 35 on the outer circumference side can hold the multiple reagent containers 200 circularly.

The reagent container holder 30 positions and fixes the reagent containers 200 by the holding portions 31. With this, it is possible to arrange each reagent container 200 at a predetermined position in the reagent container holder 30 accurately and also to inhibit the reagent container 200 from moving with respect to the reagent container holder 30.

In the configuration examples of FIGS. 3 and 4, the reagent container holder 30 is arranged in a region of an upper half side of the reagent storage 20 in the vertical direction (Z direction). With this, the reagent container holder 30 can support the upper half portion of the reagent container 200, and thus it is possible to reliably expose the lower portion of the reagent container 200 storing the reagent to the inside of the reagent storage 20. Additionally, since the upper half portion of the reagent container 200 can be supported, it is possible to hold the reagent container 200 stably when the reagent is aspirated from the above.

Figure 6:
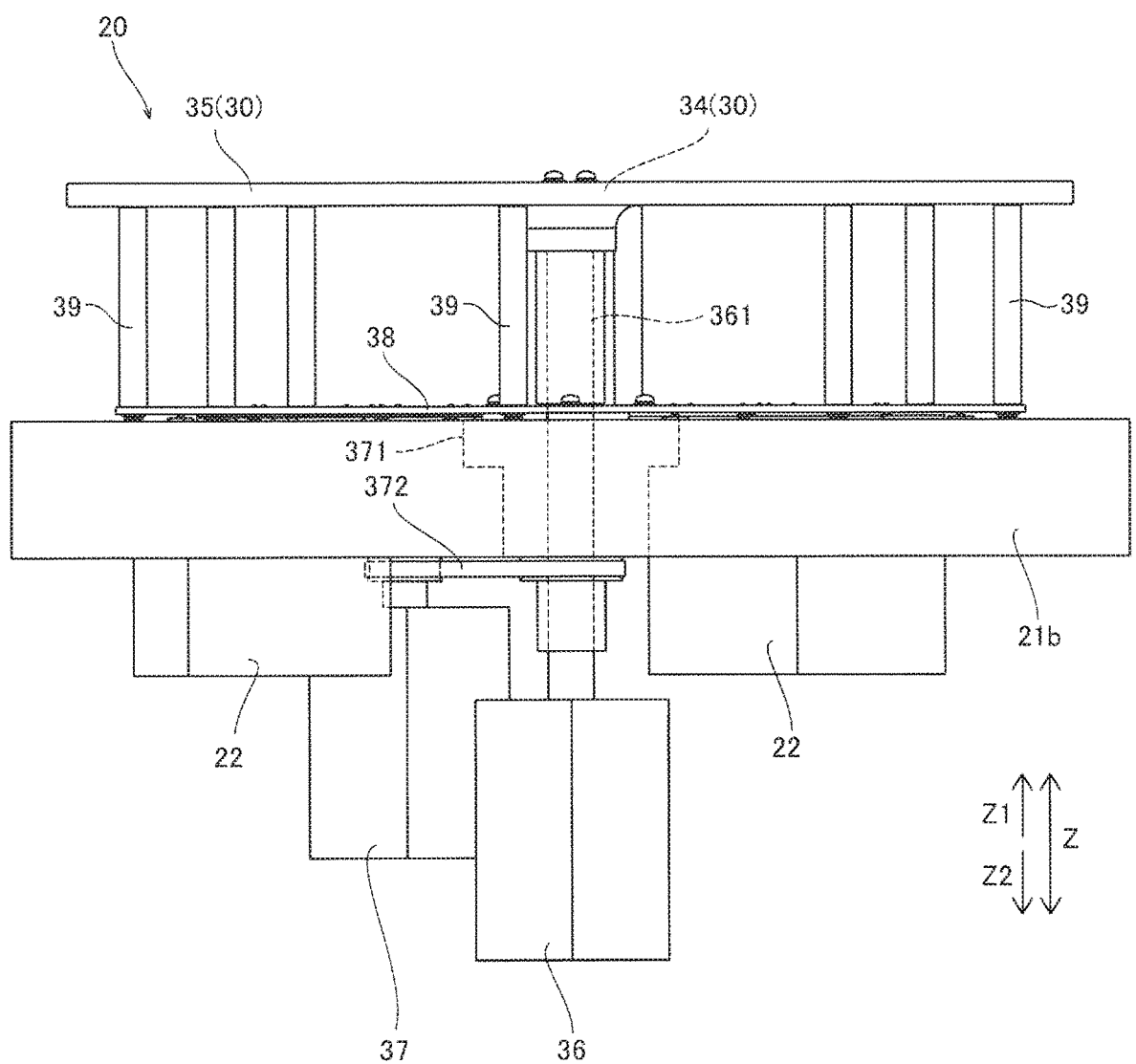
FIG. 6 is a side view illustrating a configuration example of a reagent container holder.
Figure 7:
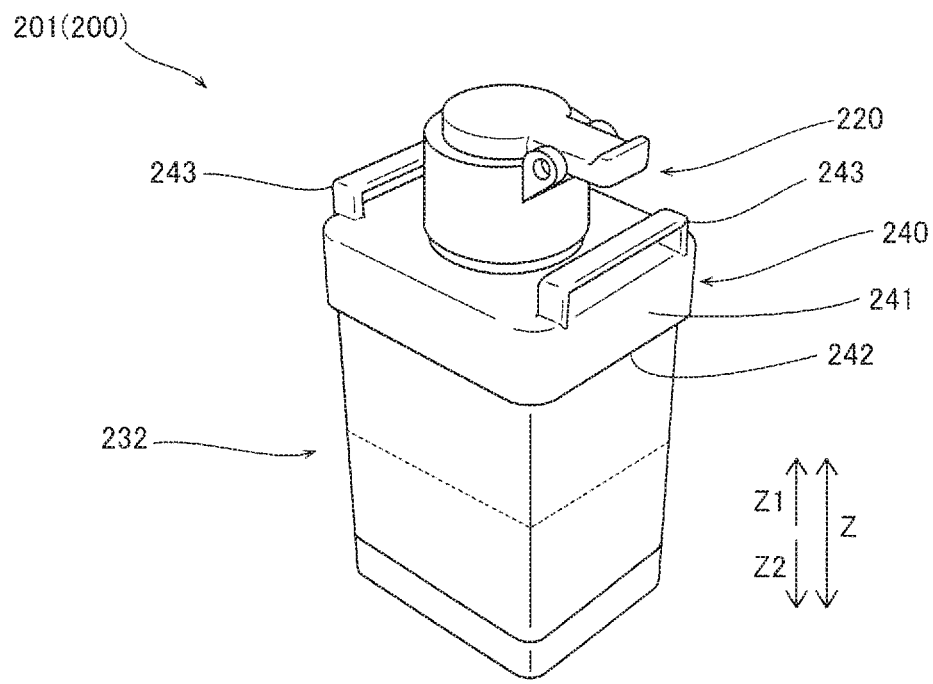
FIG. 7 is a perspective view illustrating a reagent container storing an R2-reagent.
Figure 8:
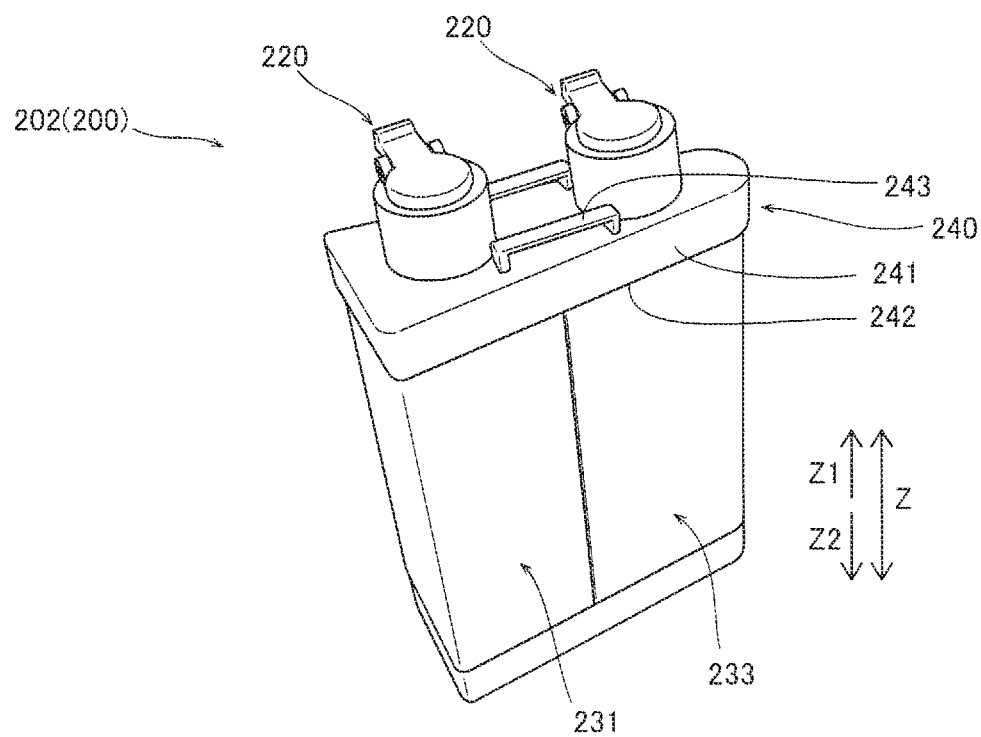
FIG. 8 is a perspective view illustrating a reagent container storing an R1-reagent and an R3-reagent.

As illustrated in FIG. 6, the first driving unit 36 is arranged outside the reagent storage 20. Specifically, the first driving unit 36 is arranged outside and below the reagent storage 20. The first driving unit 36 rotates a first supporting unit 361. The first supporting unit 361 supports the first reagent container holder 34. That is, the first driving unit 36 rotates and drives the first reagent container holder 34 through the first supporting unit 361. The first driving unit 36 is a driving source such as a stepper motor or a servomotor, for example. Specifically, the first driving unit 36 rotates the first reagent container holder 34 by rotating and driving the first supporting unit 361 connected to the center of the first reagent container holder 34 and extending vertically. In the first supporting unit 361, a lower end portion is joined to the first driving unit 36, and an upper end portion is joined to the center of the first reagent container holder 34.

Thus, it is possible to rotate and move the first reagent container holder 34 easily by the first driving unit 36 arranged outside the reagent storage 20. Additionally, with the first driving unit 36 provided outside the reagent storage 20, it is possible to inhibit the first driving unit 36 from interfering the reagent containers 200 held by the first reagent container holder 34 and also to inhibit transmission of heat of the first driving unit 36 to the inside of the reagent storage 20.

The second driving unit 37 is arranged outside the reagent storage 20. Specifically, the second driving unit 37 is arranged outside and below the reagent storage 20. The second driving unit 37 rotates a second supporting unit 371. The second supporting unit 371 supports the rotation table 38. The rotation table 38 supports the second reagent container holder 35 through the multiple joint parts 39. That is, the second driving unit 37 rotates and drives the second reagent container holder 35 through the second supporting unit 371, the rotation table 38, and the joint parts 39. The second driving unit 37 is a driving source such as a stepper motor or a servomotor, for example. Specifically, the second driving unit 37 rotates the second reagent container holder 35 by rotating and driving the rotation table 38 joined to the second reagent container holder 35 through a transmission mechanism 372. The rotation table 38 is joined to the transmission mechanism 372 through coupling and the second supporting unit 371. In the rotation table 38 and the second supporting unit 371, through-holes to allow the first supporting unit 361 to pass therethrough are provided in the centers and are rotated independently from the first supporting unit 361. With this, the second driving unit 37 and the first driving unit 36 rotate and move independently the second reagent container holder 35 on the outer circumference side and the first reagent container holder 34 on the inner circumference side, respectively.

Thus, the second reagent container holder 35 can be rotated and moved independently from the first reagent container holder 34. Additionally, with the second driving unit 37 provided outside the reagent storage 20, it is possible to inhibit the second driving unit 37 from interfering the reagent container 200 held by the second reagent container holder 35 and also to inhibit transmission of heat of the second driving unit 37 to the inside of the reagent storage 20.

The reagent container 200 includes a reagent container 201 and a reagent container 202. In the configuration examples illustrated in FIGS. 7 and 8, the reagent container 201 includes the later-described container body 232 storing the R2-reagent. The reagent container 202 is a multiply-joined type reagent container in which the later-described container body 233 storing the R3-reagent and container body 231 storing the R1-reagent are joined with each other as a pair.

The reagent container 201 and the reagent container 202 each include a top cover 240 covering the top of the container body. The top cover 240 includes an outer circumference portion 241 along a side surface of the container body to cover a part of the side surface of the container body, and a contact portion 242 is provided at a lower end portion of the outer circumference portion 241 to be engaged with the reagent container holder 30. The contact portion 242 is supported by the holding portion 31 of the reagent container holder 30. The contact portion 242 is brought into contact with the reagent container holder 30. Additionally, the contact portion 242 has an outer circumference greater than an outer circumference of the container body. In the configuration examples of FIGS. 7 and 8, the top cover 240 includes a grabbed portion 243. Moreover, the top cover 240 is provided with an openable/closable lid portion 220.

In the configuration example of FIG. 3, the lid portion 220 of each of the multiple reagent containers 201 arranged and held in the circumferential direction is arranged circularly in the same way. Each of the multiple reagent containers 202 arranged and held in the circumferential direction is arranged circularly in the same way. The container main bodies 231 and 233 of each of the multiple reagent containers 202 arranged and held in the circumferential direction are each arranged circularly in the same way. In the reagent container holder 30, the container body 232, the container body 233, and the container body 231 are arranged at radially different positions, respectively. Consequently, as illustrated in FIG. 2, in the cover 21a of the case 21, the hole portions 21d corresponding to the aspiration positions of the R1-reagent to the R3-reagent are provided at three parts so as to be overlapped with predetermined positions on the circle on which the corresponding lid portions 220 of the reagent containers 200 are arranged.

The reagent containers 200 are inserted and provided in the through-holes 33 of the reagent container holder 30. Specifically, the reagent container holder 30 includes a plate-shaped member 30a having the through-holes 33. Additionally, the plate-shaped member 30a holds each reagent container 200 to expose a bottom surface 251 of the reagent container 200 from the through-hole 33. With this, it is possible to insert the reagent container 200 from the through-hole 33 of the plate-shaped member 30a and provide the reagent container 200 in the reagent container holder 30 easily. Moreover, the plate-shaped member 30a includes the multiple suspending portions (32) that suspend the reagent containers 200 to hold. Furthermore, each suspending portion 32 has a shape tapered downward.

As illustrated in FIGS. 9A to 12, the reagent container 200 includes the bottom surface 251 that can pass through the through-hole 33 of the reagent container holder 30 and a middle side surface portion 252 between the bottom surface and a top surface that has an outer circumference greater than the outer circumference of the through-hole 33. With this, it is possible to insert the reagent container 200 from the through-hole 33 of the reagent container holder 30 and provide the reagent container 200 in the reagent container holder 30 easily. Additionally, since the middle side surface portion 252 of the reagent container 200 can be put in contact with an edge portion of the through-hole 33 of the reagent container holder 30, it is possible to provide the reagent container 200 while accurately positioning in the vertical direction. that is, it is possible to set the reagent container 200 in the reagent container holder 30 with no backlash. Moreover, it is possible to set the reagent container 200 in the reagent container holder 30 easily.

Figure 9A:
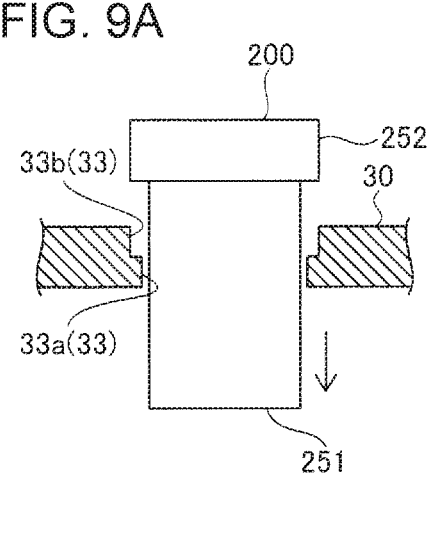
FIGS. 9A and 9B are side views illustrating a first example of a holding portion of a reagent container holder.
Figure 9B:
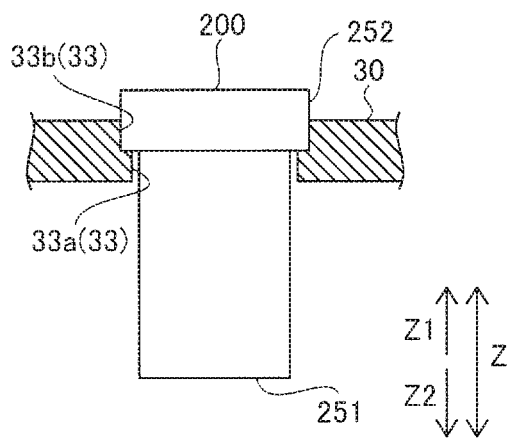

In the example illustrated in FIGS. 9A and 9B, the through-hole 33 of the reagent container holder 30 includes a lower stage opening 33a and an upper stage opening 33b provided above the lower stage opening 33a and having an outer circumference greater than an outer circumference of the lower stage opening 33a. That is, the suspending portion 32 includes the lower stage opening 33a and the upper stage opening (33b) provided above the lower stage opening 33a and having the outer circumference greater than the outer circumference of the lower stage opening 33a. Additionally, the bottom surface 251 of the reagent container 200 has an outer circumference smaller than the lower stage opening 33a, and the middle side surface portion 252 of the reagent container 200 has the outer circumference of substantially the same size with the upper stage opening 33b. Thus, since the outer circumference of the upper stage opening 33b is greater than the outer circumference of the bottom surface 251 of the reagent container 200, it is possible to insert the reagent container 200 in the upper stage opening 33b easily as illustrated in FIG. 9A. Moreover, since the reagent container 200 inserted from the upper stage opening 33b can be guided easily to the lower stage opening 33a continuing the upper stage opening 33b, it is possible to insert the reagent container 200 in the lower stage opening 33a easily. Furthermore, since the outer circumference of the upper stage opening 33b is substantially the same size with the outer circumference of the middle side surface portion 252 of the reagent container 200, it is possible to fix the reagent container 200 in the reagent container holder 30 easily by fitting the middle side surface portion 252 in the upper stage opening 33b as illustrated in FIG. 9B.

A clearance between the lower stage opening 33a and the reagent container 200 is about 1 mm to 2 mm on one side, for example. Additionally, a clearance between the upper stage opening 33b and the reagent container 200 is about 0.1 mm on one side, for example.

Moreover, only a part of the through-hole 33 may have a backlash. For example, the through-hole 33 may have a large clearance with the reagent container 200 around a corner portion. With this, it is possible to inhibit failing in fitting the reagent container 200 into the through-hole 33 because of a dimension error.

Figure 10A:
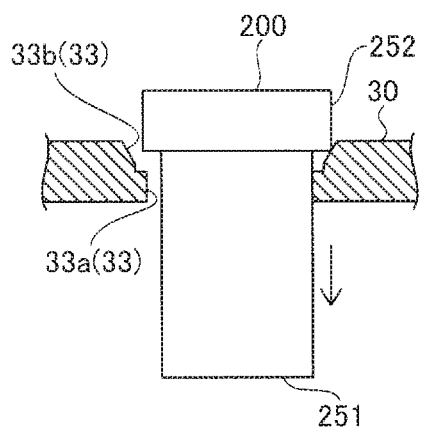
FIGS. 10A and 10B are side views illustrating a second example of a holding portion of a reagent container holder.
Figure 10B:
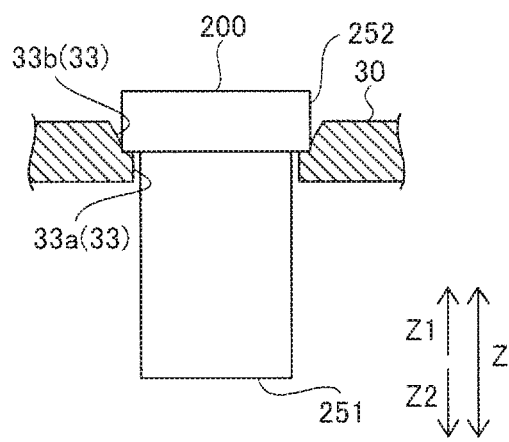

In the example illustrated in FIGS. 10A and 10B, the upper stage opening 33b has a tapered shape tapered toward the lower stage opening 33a. With this, the reagent container 200 can be guided more easily from the upper stage opening 33b to the lower stage opening 33a, and thus it is possible to provide the reagent container 200 in the reagent container holder 30 easily. That is, as illustrated in FIG. 10A, the tapered shape of the upper stage opening 33b allows the reagent container 200 to be guided to the center of the through-hole 33. Then, as illustrated in FIG. 10B, the middle side surface portion 252 of the reagent container 200 is fit and positioned in the upper stage opening 33b.

The tapered shape of the upper stage opening 33b has an inclination angle of 15 degrees to 60 degrees with respect to a perpendicular direction, for example.

Figure 11:
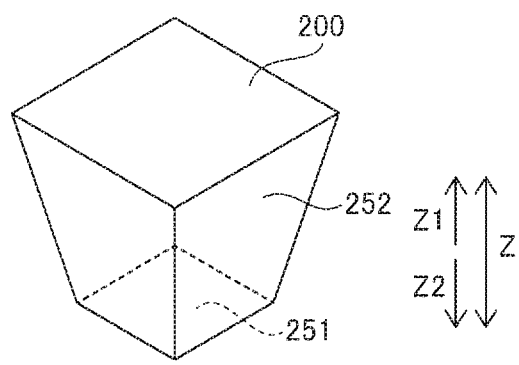
FIG. 11 is a side view illustrating another first example of a reagent container.
Figure 12:
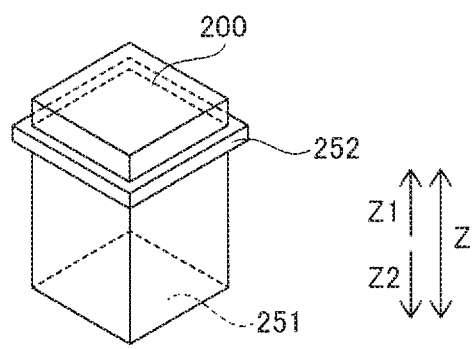
FIG. 12 is a side view illustrating another second example of a reagent container.

As illustrated in FIG. 11, the reagent container 200 may be inclined such that side surfaces expand upward. With this, the reagent container 200 is provided with the bottom surface 251 passing through the through-hole 33 and the middle side surface portion 252 fitted in the through-hole 33 with no clearance at a predetermined height position. Additionally, as illustrated in FIG. 12, in the reagent container 200, the middle side surface portion 252 may be provided to protrude from the side surfaces.

Figure 13A:
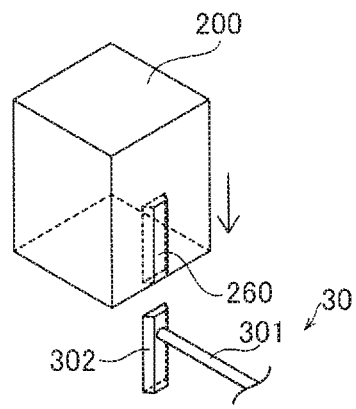
FIGS. 13A and 13B are side views illustrating another third example of a reagent container.
Figure 13B:
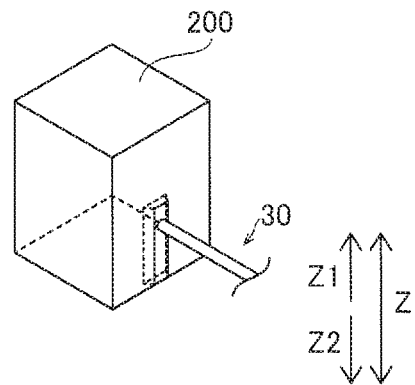

Moreover, as illustrated in FIGS. 13A and 13B, the reagent container 200 may include an engaging portion 260. In this case, the reagent container holder 30 may include a supporting portion 301 and an engaged portion 302. The reagent container 200 is held by the reagent container holder 30 with the engaging portion 260 engaged with and hooked in the engaged portion 302.

Figure 14:
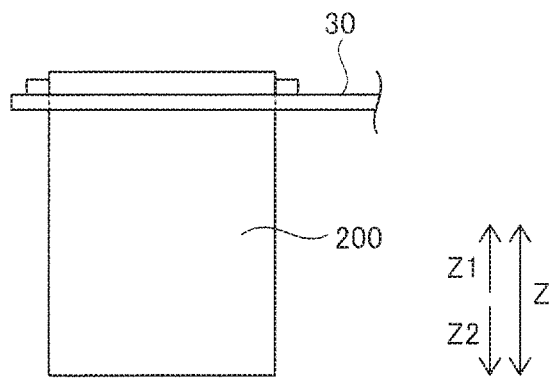
FIG. 14 is a side view illustrating a first example of a holding position of a reagent container holder.
Figure 15:
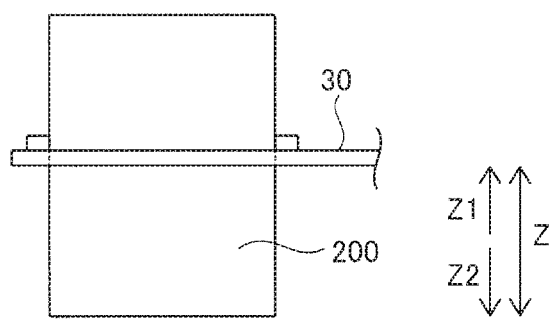
FIG. 15 is a side view illustrating a second example of a holding position of a reagent container holder.

As illustrated in FIG. 14, the reagent container holder 30 may support the upper portion of the reagent container 200. Additionally, as illustrated in FIG. 15, the reagent container holder 30 may support a portion around a middle portion in the vertical direction of the reagent container 200.

(Overview of Immune Measuring)

In the configuration examples illustrated in FIGS. 2 to 15, the immune measuring is performed using the R1-reagent to the R5-reagent as described above. An example in which subject substances 81 are hepatitis B surface antigens (HBsAg) is described with reference to FIG. 16 as an example of the immune measuring.

First, a sample containing the subject substances 81 and the R1-reagent are dispensed into the reaction container 40. The first reagent dispensing unit 191 dispenses the R1-reagent into the reaction container 40, and the sample dispensing unit 130 dispenses the sample into the reaction container 40. The R1-reagent contains capture substances 84 and is reacted with and bound to the subject substances 81. The capture substances 84 contain binding substances to allow the capture substances 84 to be bound to solid-phase carriers 82 contained in the R2-reagent.

It is possible to use combinations such as biotin and the avidin family, a hapten and an anti-hapten antibody, nickel and histigine tag, and glutathione and glutathione-S-transferase for the binding of the binding substances and the solid-phase carriers, for example. The "avidin family" means that avidin and streptavidin are included.

For example, the capture substances 84 are antibodies modified with biotin (biotin antibodies). That is, the capture substances 84 are modified with biotin as the binding substances. After the dispensing of the sample and the R1-reagent, the specimen in the reaction container 40 is heated to a predetermined temperature in the reaction unit 160, and thus the capture substances 84 and the subject substances 81 are bound.

Next, the second reagent dispensing unit 192 dispenses the R2-reagent into the reaction container 40. The R2-reagent contains the solid-phase carriers 82. The solid-phase carriers 82 are bound to the binding substances of the capture substances 84. The solid-phase carriers 82 are magnetic particles (StAvi-bound magnetic particles) to which streptavidin to be bound to biotin is fixed, for example. The streptavidin of the StAvi-bound magnetic particles is reacted with and bound to biotin as the binding substances. After the dispensing of the R2-reagent, the specimen in the reaction container 40 is heated to a predetermined temperature in the reaction unit 160. Consequently, the subject substances 81 and the capture substances 84 are bound to the solid-phase carriers 82.

The subject substances 81 and the capture substances 84 formed on the solid-phase carriers 82 and unreacted capture substances 84 are separated from each other by primary BF separation processing by the BF separation unit 180. Once the reaction container 40 is set in the processing port of the BF separation unit 180, the BF separation unit 180 executes one or more times each of the processes of aspirating the liquid phase by the cleaning unit 181 and ejecting the cleaning liquid while the magnetic particles are collected by the magnetic source 182 and agitating while no magnetic particles are collected. Unnecessary components such as the unreacted capture substances 84 are removed from the reaction container 40 by the primary BF separation processing. In the primary BF separation processing, the liquid phase in the reaction container 40 is aspirated eventually, and the process proceeds to the next process.

Figure 16:
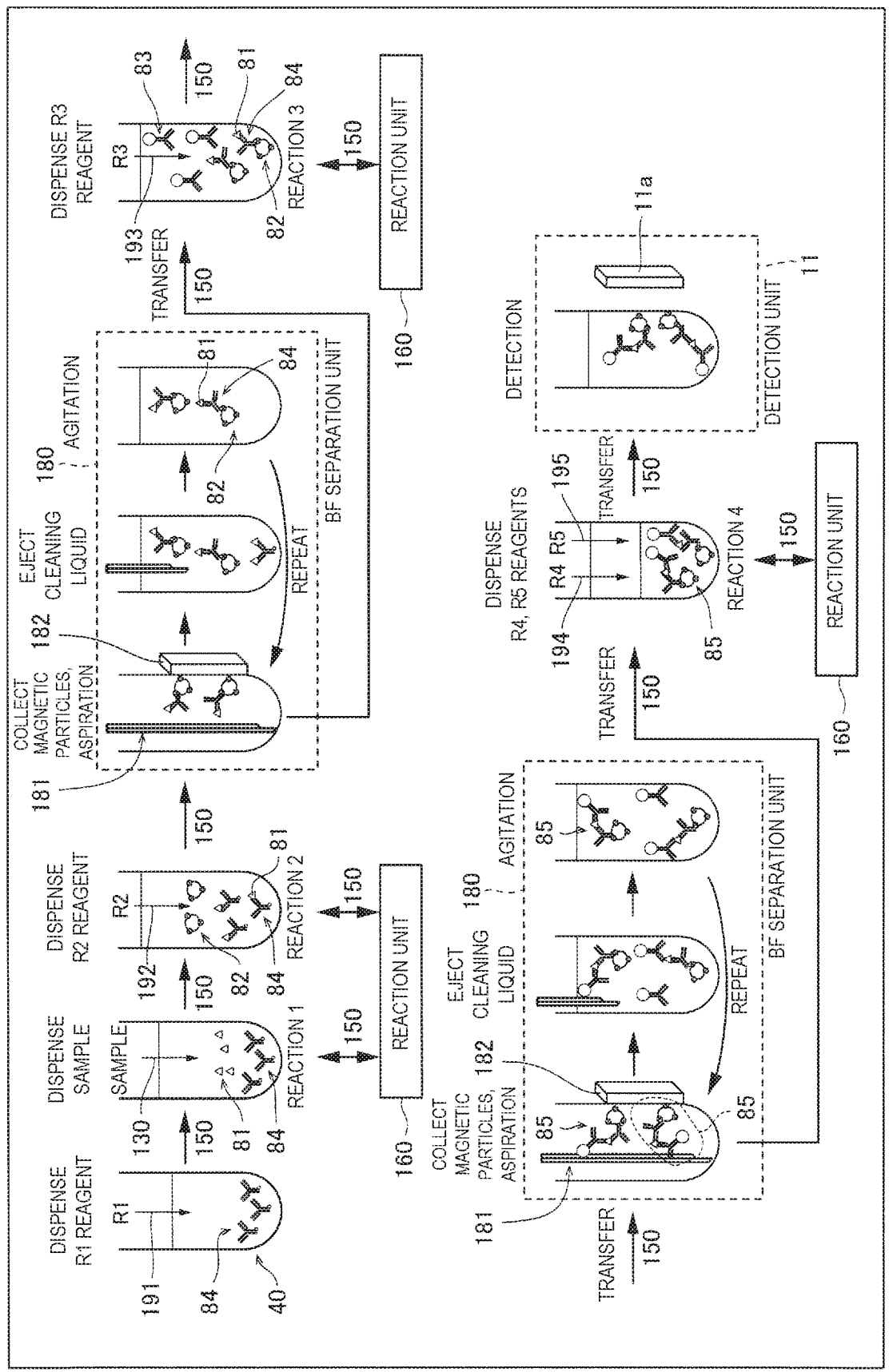
FIG. 16 is a diagram illustrating measurement processing of a sample measuring apparatus.

Next, the third reagent dispensing unit 193 dispenses the R3-reagent into the reaction container 40. The R3-reagent contains labeling substances 83 and is reacted with and bound to the subject substances 81. After the dispensing of the R3-reagent, the specimen in the reaction container 40 is heated to a predetermined temperature in the reaction unit 160. Consequently, an immune complex 85 containing the subject substance 81, the labeling substance 83, and the capture substance 84 is formed on each solid-phase carrier 82. In the example of FIG. 16, the labeling substances 83 are ALP (alkaline phosphatase) labeling antibodies.

The immune complexes 85 formed on the solid-phase carriers 82 and unreacted labeling substances 83 are separated from each other by secondary BF separation processing. The BF separation unit 180 executes one or more times each of the processes of aspirating the liquid phase and ejecting the cleaning liquid while the magnetic particles are collected by the magnetic source 182 and agitating while no magnetic particles are collected. Unnecessary components such as the unreacted labeling substances 83 are removed from the reaction container 40 by the secondary BF separation processing. In the secondary BF separation processing, the liquid phase in the reaction container 40 is aspirated eventually, and the process proceeds to the next process.

Thereafter, the fourth reagent dispensing unit 194 and the fifth reagent dispensing unit 195 dispense the R4-reagent and the R5-reagent into the reaction container 40, respectively. The R4-reagent contains a buffer solution. The immune complexes 85 bound to the solid-phase carriers 82 are dispersed in the buffer solution. The R5-reagent contains a chemiluminescent substrate. The buffer solution contained in the R4-reagent has a composition that promotes the reaction between labels (enzymes) of the labeling substances 83 contained in the immune complexes 85 and the substrate. After the dispensing of the R4 and R5-reagents, the specimen in the reaction container 40 is heated to a predetermined temperature in the reaction unit 160. With the substrate reacted with the labels, light is generated, and the intensity of the generated light is measured by the light detector 11a of the detection unit 11. Based on a detection signal of the detection unit 11, the control unit 12 measures the contained amount of the subject substances 81 in the sample.

(Description of Measurement Processing Operation)

Figure 17:
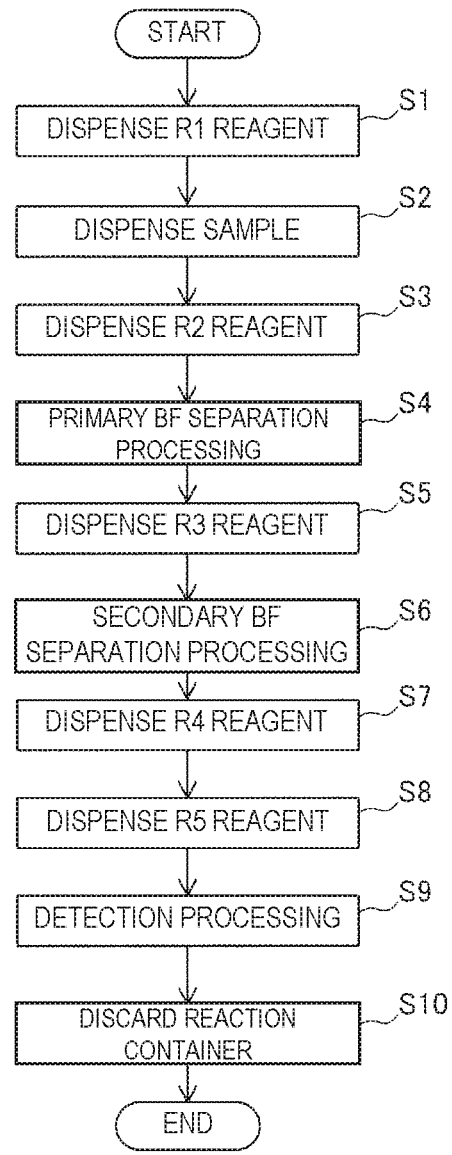
FIG. 17 is a flow diagram illustrating measurement processing, such as in FIG. 16.
Figure 18:
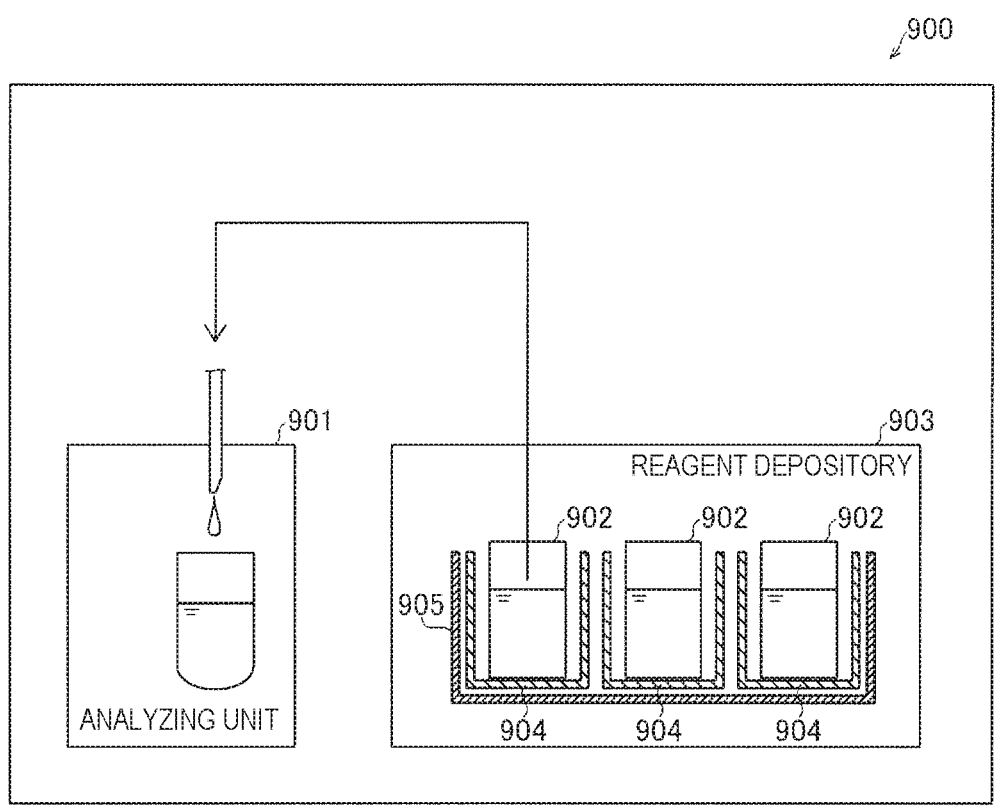
FIG. 18 is a diagram illustrating a conventional technique.

Next, the measurement processing operation of the sample measuring apparatus 100 illustrated in FIG. 16 is described with reference to FIG. 17. Additionally, the processing of each step illustrated in FIG. 17 is controlled by the control unit 12.

In step S1, the control unit 12 causes the reaction container transfer unit 150 to transfer the reaction container 40 to the R1-reagent dispensing position. The control unit 12 causes the first reagent dispensing unit 191 to dispense the R1-reagent into the reaction container 40.

In step S2, the sample is dispensed into the reaction container 40. The control unit 12 causes the sample dispensing unit 130 to aspirate the sample from the test tube on the sample transport unit 120. The control unit 12 causes the sample dispensing unit 130 to dispense the aspirated sample into the reaction container 40. After the dispending, the sample dispensing unit 130 is controlled to discard the dispensing tip to a not-illustrated discard port. Every time the dispensing operation using the dispensing tip is performed, the sample dispensing unit 130 replaces the dispensing tip with an unused dispensing tip.

In step S3, the control unit 12 causes the reaction container transfer unit 150 to transfer the reaction container 40 to the R2-reagent dispensing position and causes the second reagent dispensing unit 192 to dispense the R2-reagent into the reaction container 40. After the dispensing of the R2-reagent, the control unit 12 causes the reaction container transfer unit 150 to transfer the reaction container 40 to the reaction unit 160. The reaction container 40 is heated for a predetermined period of time in the reaction unit 160.

In step S4, the control unit 12 causes the BF separation unit 180 to execute the primary BF separation processing. First, the control unit 12 causes the reaction container transfer unit 150 to transfer the reaction container 40 to the BF separation unit 180. The BF separation unit 180 is controlled to perform the primary BF separation processing (see FIG. 16) on the specimen in the reaction container 40 and remove the liquid components.

In step S5, the control unit 12 causes the reaction container transfer unit 150 to transfer the reaction container 40 to the R3-reagent dispensing position and causes the third reagent dispensing unit 193 to dispense the R3-reagent into the reaction container 40. After the dispensing of the R3-reagent, the control unit 12 causes the reaction container transfer unit 150 to transfer the reaction container 40 to the reaction unit 160. The reaction container 40 is heated for a predetermined period of time in the reaction unit 160.

In step S6, the control unit 12 causes the BF separation unit 180 to execute the secondary BF separation processing. First, the control unit 12 causes the reaction container transfer unit 150 to transfer the reaction container 40 to the BF separation unit 180. The BF separation unit 180 is controlled to perform the secondary BF separation processing (see FIG. 16) on the specimen in the reaction container 40 and remove the liquid components.

In step S7, the R4-reagent is dispensed into the reaction container 40. The control unit 12 causes the reaction container transfer unit 150 to transfer the reaction container 40 to the R4-reagent dispensing position and causes the fourth reagent dispensing unit 194 to dispense the R4-reagent into the reaction container 40.

In step S8, the R5-reagent is dispensed into the reaction container 40. The control unit 12 causes the reaction container transfer unit 150 to transfer the reaction container 40 to the R5-reagent dispensing position and causes the fifth reagent dispensing unit 195 to dispense the R5-reagent into the reaction container 40. After the dispending of the R5-reagent, the control unit 12 causes the reaction container transfer unit 150 to transfer the reaction container 40 to the reaction unit 160. The reaction container 40 is heated for a predetermined period of time in the reaction unit 160.

In step S9, the processing of detecting the immune complexes 85 is performed. The control unit 12 causes the reaction container transfer unit 150 to transfer the reaction container 40 to the detection unit 11. The detection unit 11 measures the intensity of the light generated by making the substrate react with the labels. The detection result of the detection unit 11 is outputted to the control unit 12.

After the detection is done, in step S10, the reaction container transfer unit 150 is controlled to take out the reaction container 40 done with the measurement processing from the detection unit 11 and discard the reaction container 40 to the not-illustrated discard port.

As described above, the measurement processing operation by the sample measuring apparatus 100 is performed.

It should be construed that the embodiments disclosed herein are examples and not limitative at all points. The scope of the present invention is indicated by not the above descriptions of the embodiments but by the scope of claims, and also all the changes within the scope of claims and the meaning and scope of equivalent are included therein.

REFERENCE SIGNS LIST

10: measuring unit
20: reagent storage
21a: cover
30: reagent container holder
30a: plate-shaped member
31: holding portion
32: suspending portion
33: through-hole
33a: lower stage opening
33b: upper stage opening
34: first reagent container holder
35: second reagent container holder
36: first driving unit
37: second driving unit
38: rotation table
39: joint part
100: sample measuring apparatus
200: reagent container
231, 232, 233: container body
242: contact portion
251: bottom surface
361: first supporting unit
371: second supporting unit

The invention claimed is:

1. A sample measuring apparatus comprising:
a reagent container holder that includes a plate-shaped member including through-holes and configured to hold reagent containers each storing a reagent such that the plate-shaped member suspends the reagent containers extending respectively through the through-holes with bottom surfaces of the reagent containers being exposed below from the through-holes, wherein the reagent container holder is rotatably supported about a rotation axis;
a cooling mechanism that is provided below the plate-shaped member and in a reagent storage area, the cooling mechanism spaced apart from and opposed to the exposed bottom surfaces of the reagent containers held by the reagent container holder to cool the exposed bottom surfaces of the reagent containers held by the reagent container holder; and a measuring unit that measures a sample with the reagent of at least one of the reagent containers being mixed with the sample, wherein the reagent containers are arranged in the reagent container holder such that 50% or more of a surface of each reagent container is exposed to the reagent storage area.

2. The sample measuring apparatus according to claim 1, wherein peripheries of the through-holes comprise suspending portions that suspend the reagent containers, respectively.

3. The sample measuring apparatus according to claim 2, wherein each of the suspending portions is tapered downward.

4. The sample measuring apparatus according to claim 2, wherein each of the suspending portions comprises a lower stage opening and an upper stage opening, and the upper stage opening is provided above the lower stage opening and comprises an outer circumference greater than an outer circumference of the lower stage opening.

5. The sample measuring apparatus according to claim 1, wherein the plate-shaped member comprises a circular outer circumferential edge portion including the through-holes circularly arranged along the circular outer circumferential edge portion.

6. The sample measuring apparatus according to claim 1, wherein the reagent container holder comprises holding portions that position the reagent containers.

7. The sample measuring apparatus according to claim 1, wherein the reagent container holder comprises:
 a first reagent container holder;
 a first supporting unit supporting the first reagent container holder; and
 a first driving unit that includes a motor configured to rotate the first supporting unit.

8. The sample measuring apparatus according to claim 7, wherein the reagent container holder further comprises:
 a second reagent container holder arranged around the first reagent container holder;
 a rotation table supporting the second reagent container holder through a joint part;
 a second supporting unit supporting the rotation table; and
 a second driving unit that includes a motor configured to rotate the second supporting unit.

9. The sample measuring apparatus according to claim 1, further comprising a reagent storage comprising a cover that covers top portions of the reagent containers, wherein the reagent container holder is arranged in the reagent storage.

10. The sample measuring apparatus according to claim 9, wherein the cover covers a top portion of the reagent storage and comprises an outer circumference greater than an outer circumference of the reagent storage.

11. The sample measuring apparatus according to claim 1, wherein the reagent contains any of capture substances that are bound to target substances in the sample by an antigen-antibody reaction, solid-phase carriers that are bound to the capture substances, and labeling substances that are bound to the target substances by the antigen-antibody reaction.

12. A reagent container that is used in the sample measuring apparatus according to claim 1.

13. The sample measuring apparatus according to claim 1, wherein the cooling mechanism is provided below the plate-shaped member and in the area that is spaced apart from and opposed to the exposed bottom surfaces of the reagent containers held by the reagent container holder such that the exposed bottom surfaces of the reagent containers held by the reagent container holder are rotatable about the rotation axis so as to be movable with respect to the cooling mechanism.

14. A method of measuring a sample, comprising:

arranging reagent containers each storing a reagent in through-holes provided in a plate-shaped member of a reagent container holder supported about a rotation axis, respectively, such that the reagent containers are suspended by the plate-shaped member of the reagent container holder with bottom surfaces of the reagent containers being exposed below from the through-holes;

cooling the exposed bottom surfaces of the reagent containers held by the reagent container holder by a cooling mechanism that is provided below the plate-shaped member of the reagent container holder and in a reagent storage area, the cooling mechanism spaced apart from and opposed to the exposed bottom surfaces of the reagent containers held by the reagent container holder; and measuring a sample with the reagent from one of the reagent containers being mixed with the sample, wherein the reagent containers are arranged in the reagent container holder such that 50% or more of a surface of each reagent container is exposed to the reagent storage area.

15. The method of measuring a sample according to claim 14, wherein the plate-shaped member comprises a circular outer circumferential edge portion including the through-holes circularly arranged along the circular outer circumferential edge portion.

16. The method of measuring a sample according to claim 14, wherein the arranging the reagent containers comprises positioning by holding portions of the reagent container holder.

17. The method of measuring a sample according to claim 14, wherein the reagent contains any of capture substances that are bound to target substances in the sample by an antigen-antibody reaction, solid-phase carriers that are bound to the capture substances, and labeling substances that are bound to the target substances by the antigen-antibody reaction.

* * * * *